US012104419B2

(12) United States Patent
Storck, III et al.

(10) Patent No.: US 12,104,419 B2
(45) Date of Patent: Oct. 1, 2024

(54) MOTION CONTROL OF TELESCOPING MULTI-PANEL DOOR

(71) Applicant: GM GLOBAL TECHNOLOGY OPERATIONS LLC, Detroit, MI (US)

(72) Inventors: Phillip C. Storck, III, Washington, MI (US); Jess McCafferty, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 426 days.

(21) Appl. No.: 17/680,564

(22) Filed: Feb. 25, 2022

(65) Prior Publication Data

US 2023/0272651 A1 Aug. 31, 2023

(51) Int. Cl.

| | |
|---|---|
| ***E05F 1/16*** | (2006.01) |
| ***E05D 15/08*** | (2006.01) |
| ***E05F 5/00*** | (2017.01) |
| ***E05F 5/02*** | (2006.01) |

(52) U.S. Cl.

CPC ................ *E05F 1/16* (2013.01); *E05D 15/08* (2013.01); *E05F 5/003* (2013.01); *E05F 5/027* (2013.01); *E05Y 2201/412* (2013.01); *E05Y 2201/684* (2013.01); *E05Y 2600/45* (2013.01); *E05Y 2800/21* (2013.01); *E05Y 2800/24* (2013.01); *E05Y 2800/242* (2013.01); *E05Y 2800/73* (2013.01); *E05Y 2900/132* (2013.01)

(58) Field of Classification Search

CPC ........ E05F 1/16; E05F 5/003; E05Y 2201/40; E05Y 2201/412; E05Y 2201/414; E05Y 2600/46; E05Y 2800/242

USPC .................................. 296/24.3, 24.43, 146.9

See application file for complete search history.

(56) References Cited

U.S. PATENT DOCUMENTS

| | | | | |
|---|---|---|---|---|
| 3,510,983 | A * | 5/1970 | Barabas | E06B 3/4645 49/130 |
| 5,429,404 | A * | 7/1995 | King, Sr. | E06B 3/80 160/DIG. 16 |
| 5,513,469 | A * | 5/1996 | Tajudeen | E05F 1/16 49/404 |
| 6,158,801 | A * | 12/2000 | Tucker | B60J 5/0487 296/148 |
| 2009/0183808 | A1* | 7/2009 | Sappington | B60J 7/10 150/159 |
| 2016/0288628 | A1* | 10/2016 | Kinsey | B60J 5/047 |

* cited by examiner

*Primary Examiner* — Jason S Daniels
(74) *Attorney, Agent, or Firm* — CANTOR COLBURN LLP

(57) ABSTRACT

A door assembly of a vehicle includes a first door panel movable at least partially across a door opening from a first side of the door opening toward a second side of the door opening, a second door panel spaced apart from the first door panel and movable at least partially across the door opening from the first side toward the second side. A first magnetic element is located at the first door panel and a second magnetic element is located at the second door panel. The second magnetic element is interactive with the first magnetic element such that moving of the first door across the door opening causes movement of the second door panel across the door opening.

18 Claims, 7 Drawing Sheets

MOTION CONTROL OF TELESCOPING MULTI-PANEL DOOR

INTRODUCTION

The subject disclosure relates to vehicle doors, and in particular to multi-panel sliding door systems for vehicles.

Some vehicles, such as trucks with enclosed cargo compartments, have a wall separating the passenger compartment from the cargo compartment. A door is often included in the dividing wall to allow access for the vehicle driver to the cargo compartment. In some such vehicles, the door is hinged, while in other vehicles, the door is a sliding door or pocket door configuration. It is desired for the driver or other user to be able to operate the door with minimal effort, to move the door between a closed position and an opened position.

SUMMARY

In one embodiment, a door assembly of a vehicle includes a first door panel movable at least partially across a door opening from a first side of the door opening toward a second side of the door opening, a second door panel spaced apart from the first door panel and movable at least partially across the door opening from the first side toward the second side. A first magnetic element is located at the first door panel and a second magnetic element is located at the second door panel. The second magnetic element is interactive with the first magnetic element such that moving of the first door across the door opening causes movement of the second door panel across the door opening.

Additionally or alternatively, in this or other embodiments a first guide groove is receptive of the first door panel, and a second guide groove receptive of the second door panel.

Additionally or alternatively, in this or other embodiments a hard stop is located in the second guide groove to stop movement of the second door panel when moving the door assembly from the opened position toward the closed position.

Additionally or alternatively, in this or other embodiments the hard stop breaks the magnetic interaction between the first door panel and the second door panel, such that the first door panel is movable independent of the second door panel.

Additionally or alternatively, in this or other embodiments the first magnetic element and the second magnetic element have polarities oriented to attract the second door panel to the first door panel.

Additionally or alternatively, in this or other embodiments the first magnetic element is located at a bottom portion of the first door panel, and the second magnetic element is located at a bottom portion of the second door panel.

Additionally or alternatively, in this or other embodiments first magnetic element is a steel insert attached to the first door panel.

Additionally or alternatively, in this or other embodiments one or more of the first magnetic element or the second magnetic element are located at a side edge of the respective first door panel or the second door panel.

In another embodiment, a vehicle includes a first compartment, a second compartment, and a dividing wall separating the first compartment from the second compartment. A door assembly is located at a door opening in the dividing wall. The door assembly includes a first door panel movable at least partially across the door opening from a first side of the door opening toward a second side of the door opening, and a second door panel spaced apart from the first door panel and movable at least partially across the door opening from the first side toward the second side. A first magnetic element is located at the first door panel, and a second magnetic element is located at the second door panel. The second magnetic element is interactive with the first magnetic element such that moving of the first door across the door opening causes movement of the second door panel across the door opening.

Additionally or alternatively, in this or other embodiments a first guide groove is receptive of the first door panel, and a second guide groove is receptive of the second door panel.

Additionally or alternatively, in this or other embodiments a hard stop is located in the second guide groove to stop movement of the second door panel when moving the door assembly from the opened position toward the closed position.

Additionally or alternatively, in this or other embodiments the hard stop breaks the magnetic interaction between the first door panel and the second door panel, such that the first door panel is movable independent of the second door panel.

Additionally or alternatively, in this or other embodiments the first magnetic element and the second magnetic element have polarities oriented to attract the second door panel to the first door panel.

Additionally or alternatively, in this or other embodiments the first magnetic element is located at a bottom portion of the first door panel, and the second magnetic element is located at a bottom portion of the second door panel.

Additionally or alternatively, in this or other embodiments the first magnetic element is a steel insert attached to the first door panel.

Additionally or alternatively, in this or other embodiments the first compartment is a passenger compartment and the second compartment is a cargo compartment.

Additionally or alternatively, in this or other embodiments the second compartment is an enclosed cargo compartment.

Additionally or alternatively, in this or other embodiments one or more of the first magnetic element or the second magnetic element are located at a side edge of the respective first door panel or the second door panel.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
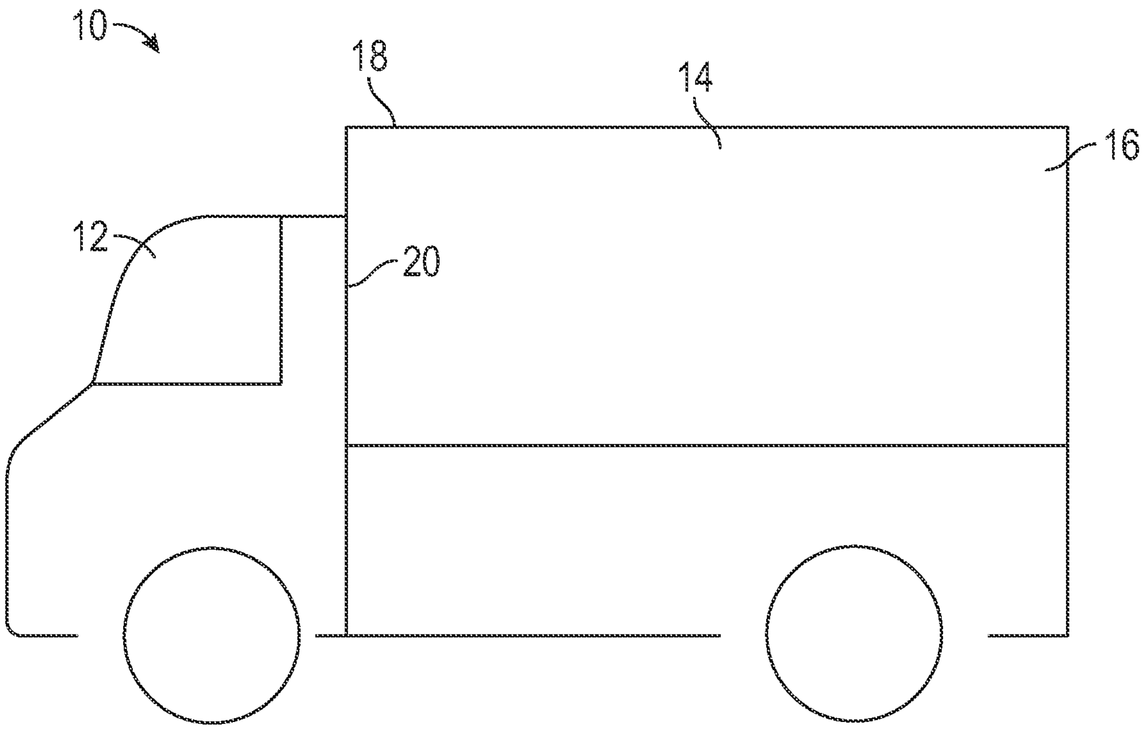
FIG. 1 is a perspective view of an embodiment of a vehicle.

The following description is merely exemplary in nature and is not intended to limit the present disclosure, its application or uses. It should be understood that throughout the drawings, corresponding reference numerals indicate like or corresponding parts and features.

Figure 2:
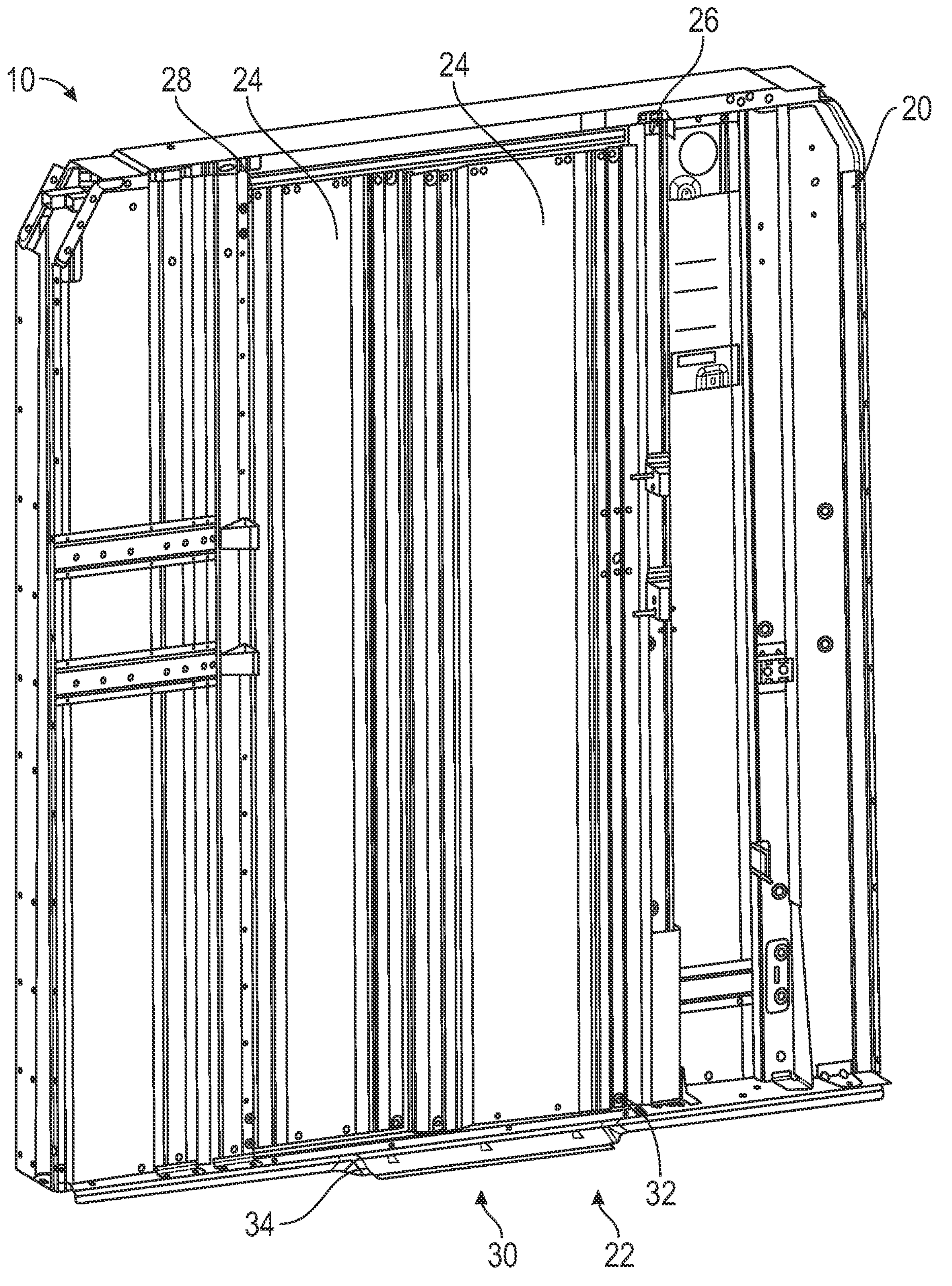
FIG. 2 is a perspective view of an embodiment of a vehicle portion including a door assembly in a closed position.
Figure 3:
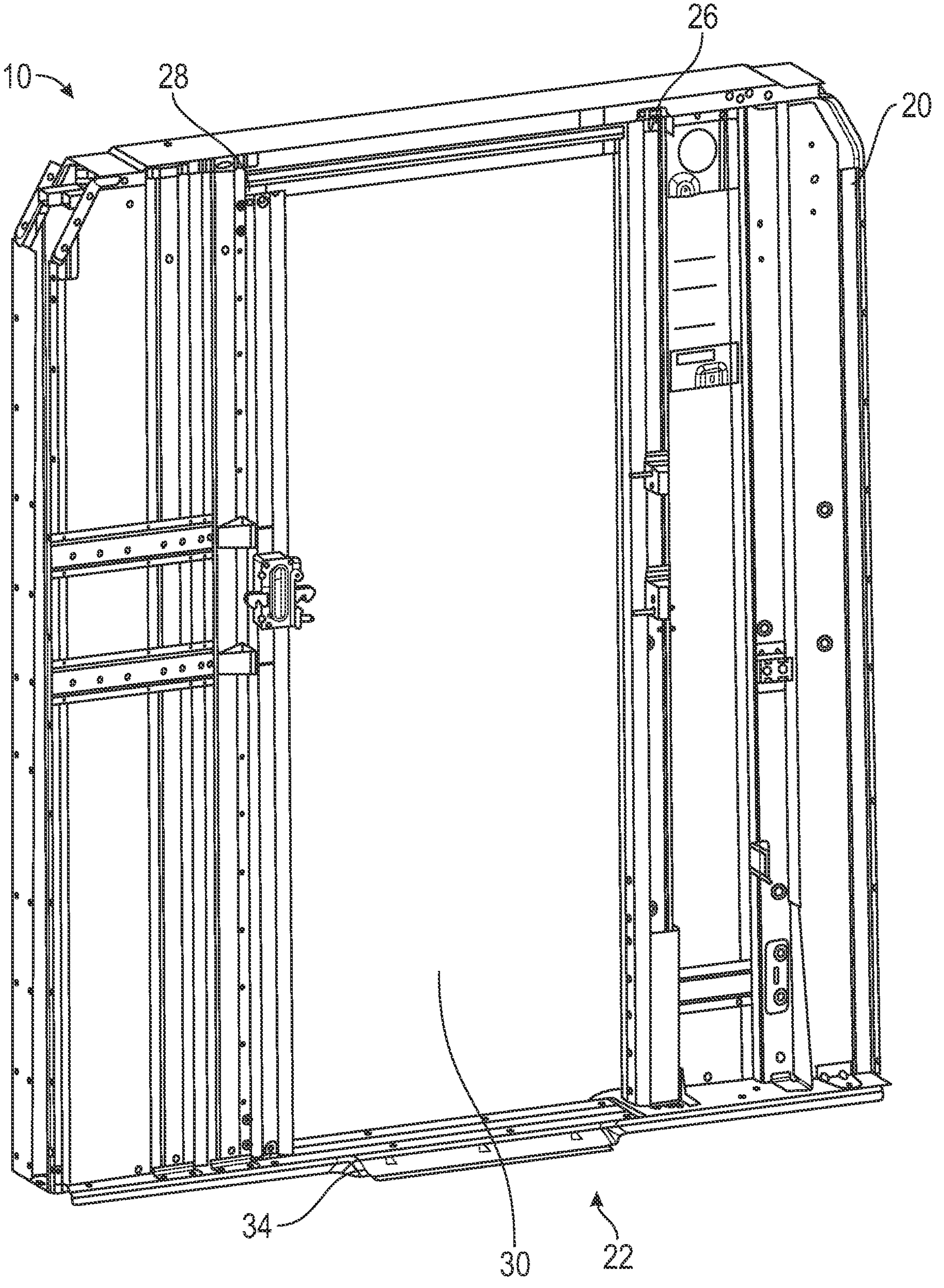
FIG. 3 is a perspective view of an embodiment of a vehicle portion including a door assembly in an opened position.

In accordance with an exemplary embodiment, a vehicle 10 is illustrated in FIG. 1. The vehicle 10 includes a passenger compartment 12 from which a user drives the vehicle 10. Further, the vehicle 10 includes a cargo compartment 14, which in some embodiments is an enclosed cargo compartment 14, having side walls 16 and a roof 18. Referring to FIG. 2, the vehicle 10 includes a dividing wall 20 between the passenger compartment 12 and the cargo compartment 14. To allow the user to easily move between the passenger compartment 12 and the cargo compartment 14 without exiting the vehicle 10, a door assembly 22 is located in the dividing wall 20. The door assembly 22 is a multi-panel sliding door assembly 22 having two or more door panels 24. The door panels 24 are moveable between a first side 26 and a second side 28 of a door opening 30, and between a closed position relative to the door opening 30 illustrated in FIG. 2 and an opened position as illustrated in FIG. 3.

Figure 4:
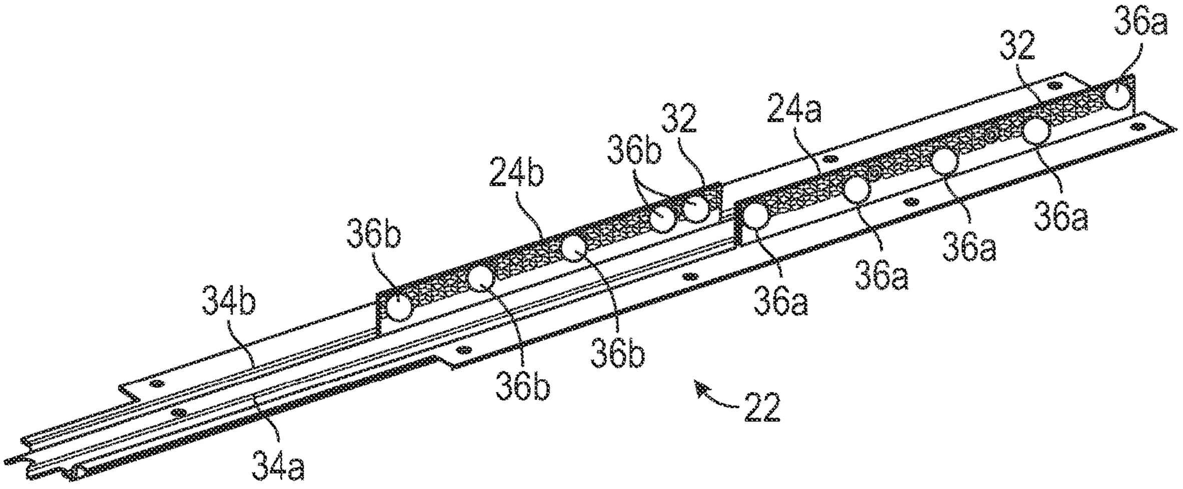
FIG. 4. is a perspective view of an embodiment of a guide groove for a door assembly.

Referring now to FIG. 4, in some embodiments a bottom end 32 of each door panel 24 is located in a guide groove 34 of the vehicle. A first door panel 24*a* is located in a first guide groove 34*a*, while a second door panel 24*b* is located in a second guide groove 34*b*, which is spaced apart from the first guide groove 34*a*. The guide grooves 34*a* and 34*b* aid in positioning the door panels 24*a*, 24*b* and are utilized to guide the door panels 24*a*, 24*b* between the opened position and the closed position. Each of the door panels 24*a*, 24*b* include magnetic elements 36, which as described in more detail below are utilized to control motion of the door panels 24*a*, 24*b* when moving the door panels between the opened position and the closed position. While in some embodiments, the magnetic elements 36 are permanent magnets, in other embodiments the magnetic elements 36 are electromagnets, which are selectably or automatically activated when the door panels 24*a*, 24*b* are moved between the opened position and the closed position. Further, while in some embodiments, the magnetic elements 36 are located at or near a first widthwise end and a second widthwise end of the door panels 24, while additional magnetic elements 36 may be arrayed along the width of the door panel 24 as illustrated in FIG. 4.

Figure 5:
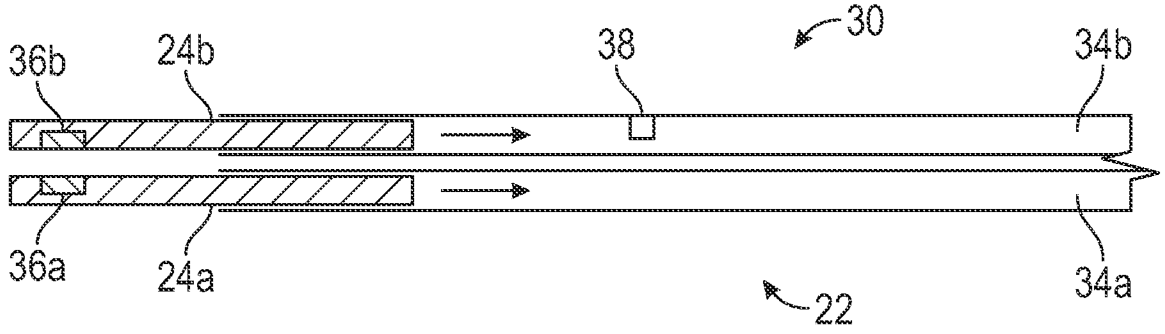
FIG. 5 is a sectional view of an embodiment of a door assembly in an open position, moving toward a closed position.
Figure 6:
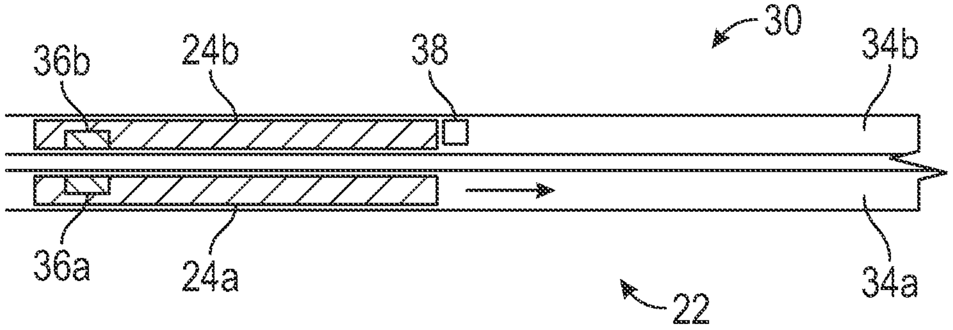
FIG. 6 is a sectional view of an embodiment of a door assembly in a partially opened position.
Figure 7:
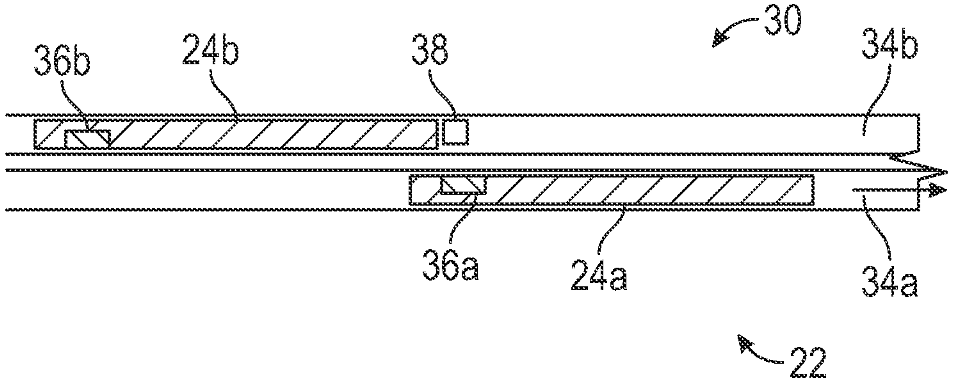
FIG. 7 is a sectional view of an embodiment of a door assembly in a moving towards closed position with the trailing door against the stop.

Referring to FIG. 5, FIG. 6 and FIG. 7, illustrated is an operation of the door assembly 22 from the opened position to the closed position. In FIG. 5, the door assembly 22 is shown in the opened position. First magnetic elements 36*a* of the first door panel 24*a* align with second magnetic elements 36*b* of the second door panel 24*b*, and have opposite polarity such that the second magnetic elements 36*b* are attracted to the first magnetic elements 36*a*. The magnetic elements 36*a* and 36*b* are located and sized to provide a desired level of magnetic force therebetween. Further, while in the present description, the magnetic elements 36*a* and 36*b* are described as attracting, in other embodiments the magnetic elements 36*a* and 36*b* are oriented to have a repulsive force therebetween. Further, in embodiments such as in FIG. 4, where additional magnetic elements 36 are arrayed along the width of the door panel 24, the magnetic elements 36*a* and 36*b* may be oriented to have a mixture or combination of attractive and repulsive forces therebetween to achieve a desired motion of the door panels 24*a* and 24*b*. To move the door assembly 22 from the opened position toward the closed position, a user moves the first door panel 24*a*, also referred to as a leading door panel 24*a*, along the first guide groove 34*a* toward the closed position. Due to the magnetic interaction of the second magnetic elements 36*b* and the first magnetic elements 36*a*, when the leading door panel 24*a* is moved, the second door panel 24*b*, also referred to as a trailing door panel 24*b*, moves with the leading door panel 24*a* along the second guide groove 34*b* toward the close position.

Referring to FIG. 6, the leading door panel 24*a* and the trailing door panel 24*b* move together until the trailing door panel 24*b* engages a hard stop feature 38 disposed, for example, in the second guide groove 34*b* to stop movement of the trailing door panel 24*b*. The user continues to move the leading door panel 24*a* toward the closed position, and due to the hard stop feature 38 engaging with the trailing door panel 24*b*, the magnetic interaction between second magnetic elements 36*b* and the first magnetic elements 36*a* is overcome. Thus, the leading door panel 24*a* continues to move to the closed position as illustrated in FIG. 7.

Figure 8:
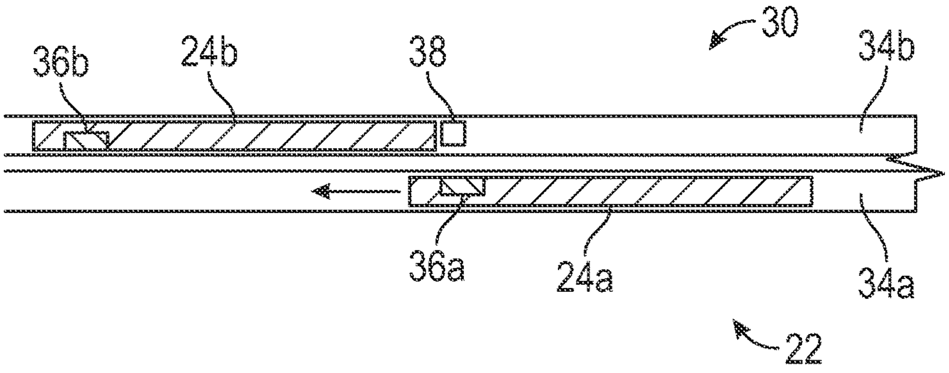
FIG. 8 is a sectional view of an embodiment of a door assembly in an closed position, moving toward a open position.
Figure 9:
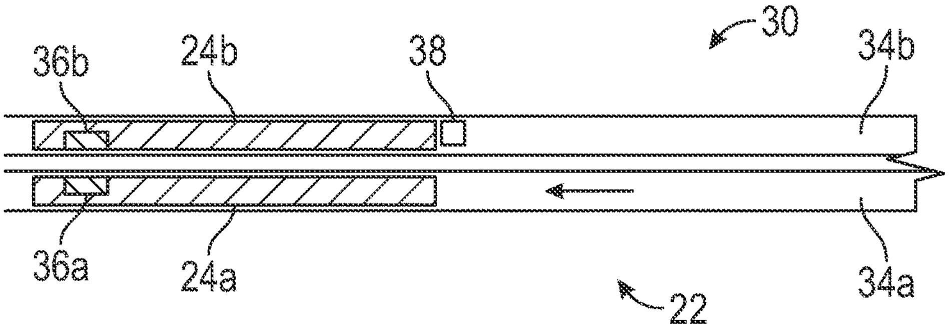
FIG. 9 is a sectional view of an embodiment of a door assembly in a partially closed position moving towards an open position.
Figure 10:
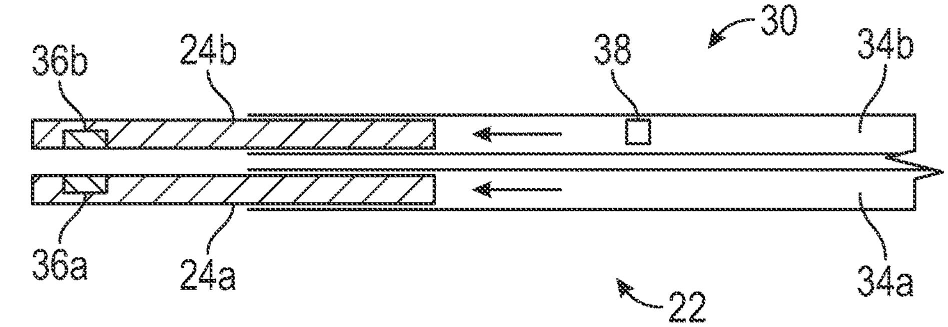
FIG. 10 is a sectional view of an embodiment of a door assembly in the open position.

The operation is substantially reversed to move the door assembly 22 from the closed position to the opened position, as shown in FIGS. 8, 9, and 10. The leading door panel 24*a* is moved toward the open position until the first magnetic elements 36*a* are interactive with the second magnetic elements 36*b* sufficiently so that the trailing door panel 24*b* moves with the leading door panel 24*a* until both the leading door panel 24*a* and the trailing door panel 24*b* are in the opened position.

Figure 11:
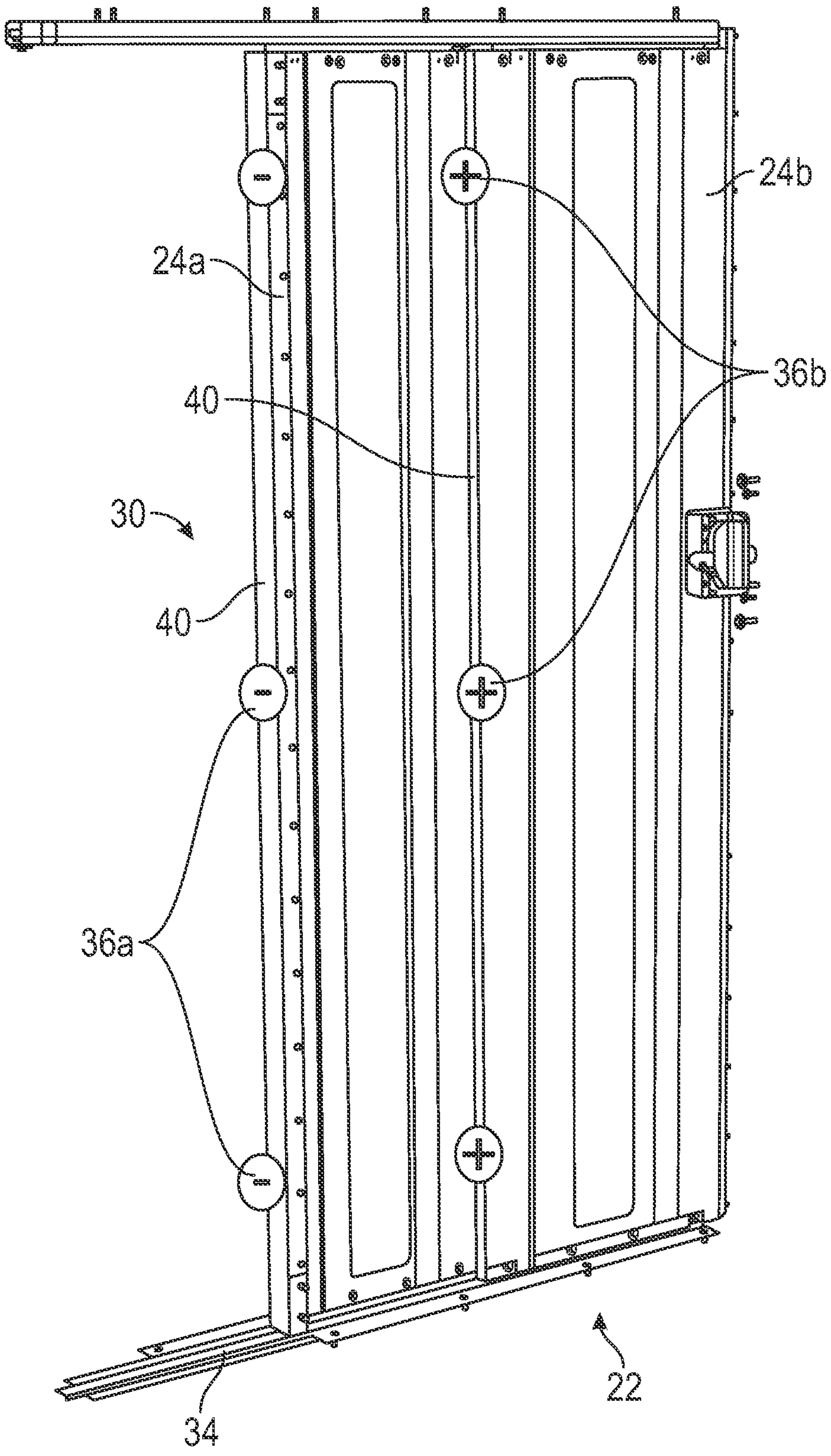
FIG. 11 is a perspective view of another embodiment of a door assembly.

While in some embodiments the magnetic elements 36 are located at or near the bottom end 32 of the door panel 24, in other embodiments the magnetic elements 36 are positioned at other locations of the door panel 24. For example, such as illustrated in FIG. 11, the magnetic elements 36 may be located at a door side edge 40 of the door panels 24. Further, on one or of the door panels 24, the magnetic elements 36 may be replaced with a steel insert embedded in or affixed to the door panel 24. The configurations described herein allow for improved ease of operation of the door assembly 22 in the vehicle 10.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A door assembly of a vehicle, comprising:

a first door panel movable at least partially across a door opening from a first side of the door opening toward a second side of the door opening;

a second door panel spaced apart from the first door panel and movable at least partially across the door opening from the first side toward the second side;

a first magnetic element disposed at the first door panel; and a second magnetic element disposed at the second door panel, the second magnetic element interactive with the first magnetic element such that moving of the first door across the door opening causes movement of the second door panel across the door opening.

2. The door assembly of claim 1, further comprising:

a first guide groove receptive of the first door panel; and a second guide groove receptive of the second door panel.

3. The door assembly of claim 2, further comprising a hard stop disposed in the second guide groove to stop movement of the second door panel when moving the door assembly from an opened position toward a closed position.

4. The door assembly of claim 3, wherein the hard stop breaks the magnetic interaction between the first door panel and the second door panel, such that the first door panel is movable independent of the second door panel.

5. The door assembly of claim 1, wherein the first magnetic element and the second magnetic element have polarities oriented to attract the second door panel to the first door panel.

6. The door assembly of claim 1, wherein:

the first magnetic element is disposed at a bottom portion of the first door panel; and the second magnetic element is disposed at a bottom portion of the second door panel.

7. The door assembly of claim 1, wherein first magnetic element is a steel insert attached to the first door panel.

8. The door assembly of claim 1, wherein one or more of the first magnetic element or the second magnetic element are disposed at a side edge of the respective first door panel or the second door panel.

9. A vehicle, comprising:

a first compartment;

a second compartment;

a dividing wall separating the first compartment from the second compartment;

a door assembly disposed at a door opening in the dividing wall, the door assembly including:

a first door panel movable at least partially across the door opening from a first side of the door opening toward a second side of the door opening;

a second door panel spaced apart from the first door panel and movable at least partially across the door opening from the first side toward the second side;

a first magnetic element disposed at the first door panel; and a second magnetic element disposed at the second door panel, the second magnetic element interactive with the first magnetic element such that moving of the first door across the door opening causes movement of the second door panel across the door opening.

10. The vehicle of claim 9, further comprising:

a first guide groove receptive of the first door panel; and a second guide groove receptive of the second door panel.

11. The vehicle of claim 10, further comprising a hard stop disposed in the second guide groove to stop movement of the second door panel when moving the door assembly from an opened position toward a closed position.

12. The vehicle of claim 11, wherein the hard stop breaks the magnetic interaction between the first door panel and the second door panel, such that the first door panel is movable independent of the second door panel.

13. The vehicle of claim 9, wherein the first magnetic element and the second magnetic element have polarities oriented to attract the second door panel to the first door panel.

14. The vehicle of claim 9, wherein:

the first magnetic element is disposed at a bottom portion of the first door panel; and the second magnetic element is disposed at a bottom portion of the second door panel.

15. The vehicle of claim 8, wherein first magnetic element is a steel insert attached to the first door panel.

16. The vehicle of claim 9, wherein the first compartment is a passenger compartment and the second compartment is a cargo compartment.

17. The vehicle of claim 16, wherein the second compartment is an enclosed cargo compartment.

18. The vehicle of claim 9, wherein one or more of the first magnetic element or the second magnetic element are disposed at a side edge of the respective first door panel or the second door panel.

* * * * *